April 12, 1955 H. M. GEYER 2,705,939
FLUID PRESSURE ACTUATOR
Filed July 1, 1952 2 Sheets-Sheet 1

INVENTOR.
HOWARD M. GEYER
BY
Willits, Hardman and Fohr
ATTORNEYS

April 12, 1955  H. M. GEYER  2,705,939
FLUID PRESSURE ACTUATOR
Filed July 1, 1952  2 Sheets-Sheet 2
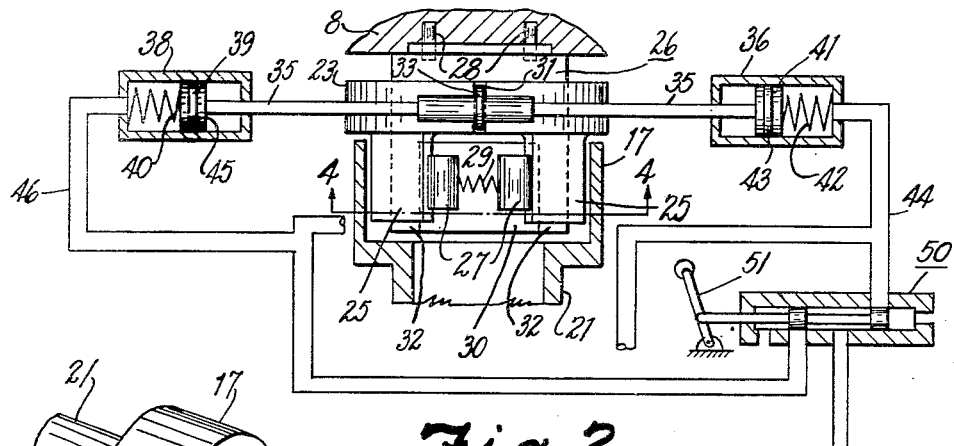
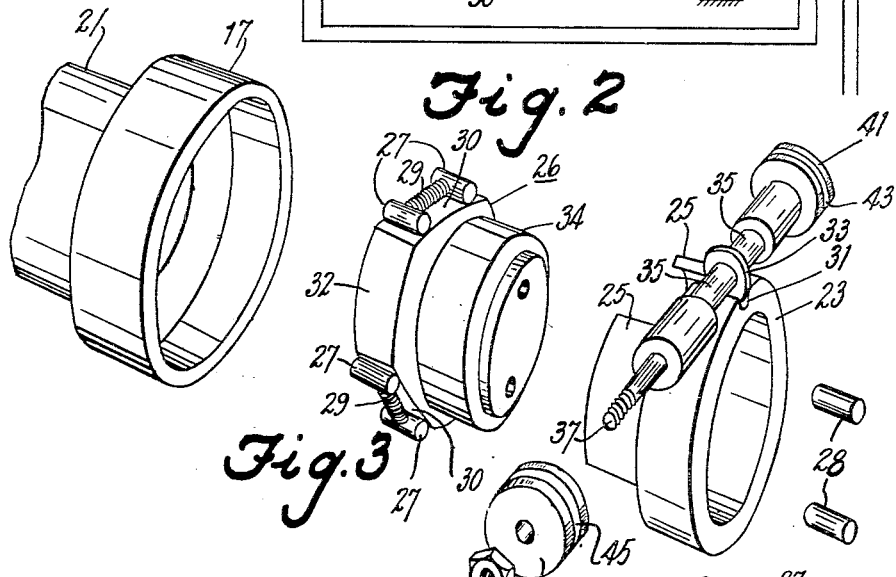
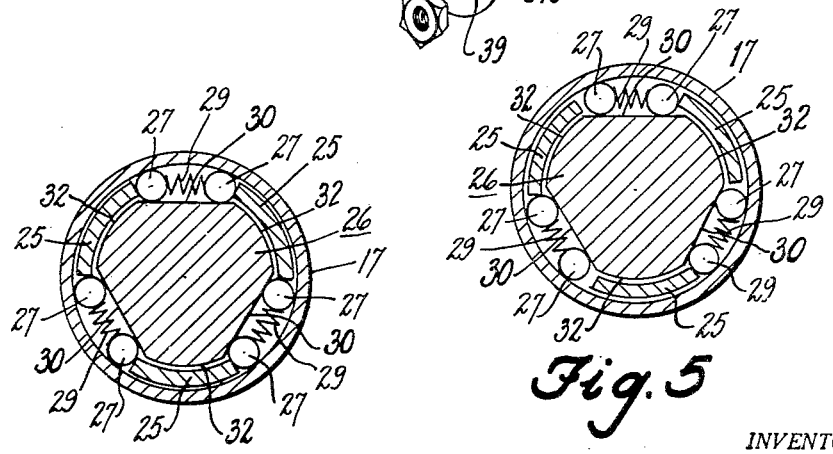
INVENTOR.
HOWARD M. GEYER
BY
ATTORNEYS

United States Patent Office 2,705,939
Patented Apr. 12, 1955

2,705,939

FLUID PRESSURE ACTUATOR

Howard M. Geyer, Dayton, Ohio, assignor to General Motors Corporation, Detroit, Mich., a corporation of Delaware Application July 1, 1952, Serial No. 296,607

10 Claims. (Cl. 121—40)

The present invention relates to actuators and more particularly to actuators operated by fluid medium under pressure.

In actuators generally, and particularly in actuators specifically designed for aircraft use, locking means for maintaining the movable element of the actuator and the load device associated therewith at a fixed position during the absence of motive fluid, are a necessity. However, the locking devices generally used with actuators are unidirectional in nature. That is, when motive fluid is supplied to the actuator, the locking means are concurrently released, thereby allowing movement of the load device by the actuator in either direction. This feature is often undesirable, for instance, when the combined forces of the load device are instantaneously greater than the restraining or operating force of the motive fluid, in which instance the load device tends to move in a direction opposite to that desired. The occurrence of such phenomena can be remedied by the utilization of positive locking means that are effective in both directions of actuator movement. Accordingly, my objects include the provision of an actuator with locking means that are operative to positively restrain movement in two directions and further include the provision of means for releasing the locking means concurrently in only one direction upon the application of motive fluid to the actuator to obtain a movement in that one direction.

The aforementioned and other objects are accomplished in the present invention by providing bidirectional locking means for a rotatable element of the actuator. Specifically, the actuator includes a cylinder having disposed therein a piston mounted for reciprocal movement. The piston is provided with a rod that projects through one end of the cylinder and is adapted for connection with a load device, such as an aircraft control surface. Associated with the piston is a nut having an internal spiral thread. One end of a complementary spirally threaded screw shaft engages the nut through the media of a plurality of balls so that upon reciprocal movement of the piston and nut, the screw shaft will be rotated. The other end of the screw shaft is formed as a locking collar, rotatably journalled by bearing means within the cylinder. Coaxially disposed within the locking collar is a cam member having three flat surfaces separated by a like number of arcuate surfaces. Mounted upon the flats are double acting clutches which comprise a pair of axially extending rollers normally urged apart by a preloaded spring, the ends of which engage the medial portions thereof. A lock release collar having three axially extending fingers, coaxially disposed between the arcuate surfaces of the cam member and the locking collar, is mounted for arcuate movement to permit rotative movement of the locking collar in either of two directions.

The lock release collar, rotatably journaled on an axially extending portion of the cam member, is provided with a notch in its outer circumferential surface. The cam member is restrained from rotation by any suitable means. A one-toothed rack meshes with the notch on the lock release collar and effects arcuate movement thereof upon reciprocal movement of a piston rod operatively connected to the rack. The piston rod is provided with piston heads at opposite ends thereof, which pistons are disposed for reciprocal movement in lock release cylinders mounted transversely of the actuator cylinder. Suitable ports, passages and valve mechanism are provided to direct fluid medium under pressure to the various cylinders.

In operation fluid under pressure is directed by the valve mechanism concurrently to one of the lock release cylinders and one of the actuator cylinder chambers, whereupon the screw shaft and locking collar will be released for rotation in one direction, permitting reciprocal movement of the actuator piston in one direction. As the several relative movable parts of the actuator are restrained from movement in the opposite direction, the load device cannot effect undesired movement of the actuator piston.

Further objects and advantages of the present invention will be apparent from the following description, reference being had to the accompanying drawings wherein a preferred embodiment of the present invention is clearly shown.

In the drawings:

Fig. 2 is a diagrammatic view of the actuator locking means and the releasing means therefor.

Fig. 3 is an exploded view, in perspective, of the locking means and the lock releasing means therefor.

Fig. 4 is a sectional view taken along line 4—4 of Fig. 2 with the locking means shown in the locked position.

Fig. 5 is a sectional view taken along line 4—4 of Fig. 2 with the locking means shown in the partially released position.

Figure 1:
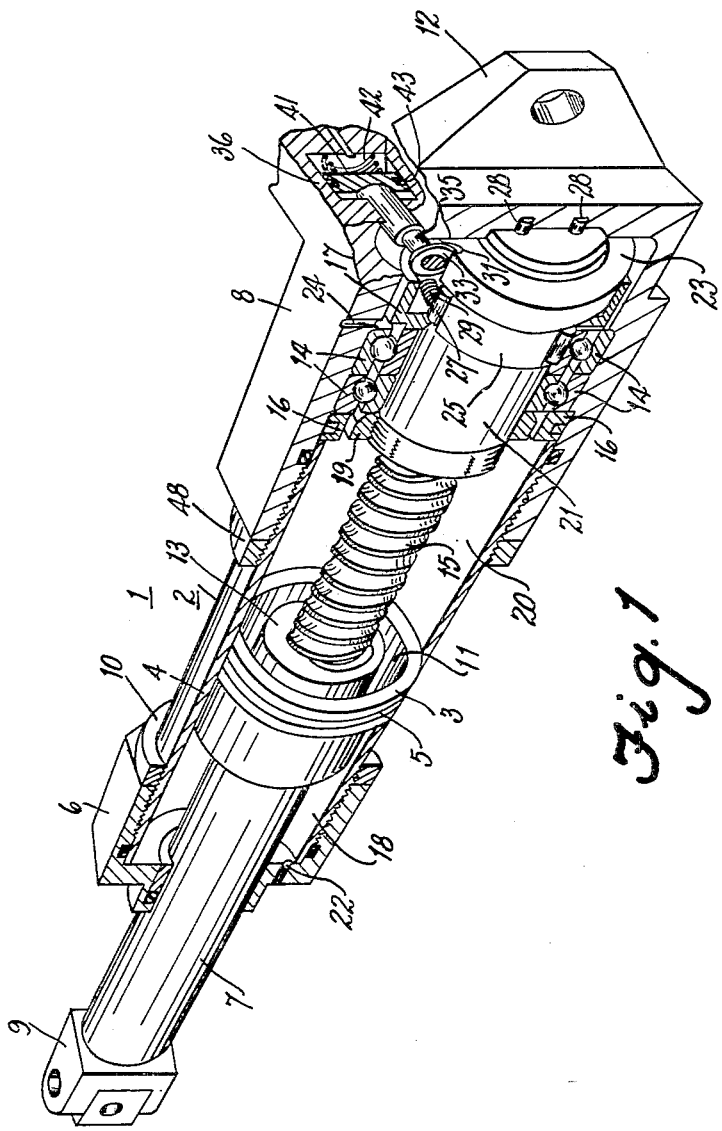
Fig. 1 is a sectional view, somewhat in perspective, of a fluid pressure actuator with certain of its parts removed.

Referring more particularly to Fig. 1, an actuator, designated generally by 1, is shown including a cylinder 2, having disposed therein a piston 3. The cylinder 2 comprises a tubular portion 4, a centrally apertured head cap member 6 and a tail cap member 8. The head cap member 6 threadedly engages one end of the tubular member 4 and is retained in position thereon by means of a locking ring 10. The tail cap member 8, likewise, threadedly engages the other end of tubular member 4 and is retained thereon by means of a locking ring 48. Suitable fluid seals are provided between the ends of the tubular member 4 and the end cap members. The piston 3 is provided with an O-ring seal 5, which insures fluid-tight engagement between the circumferential surface of the piston and the inner surface of the cylinder walls defined by the tubular member 4. The piston 3 is formed integral with an axially extending hollow rod 7 which extends through the aperture in the head cap 6 and is provided at its free end with a fixture 9. The fixture 9 may be attached to any suitable load device, not shown, such as an aircraft control surface. Suitable sealing means are provided between the aperture in the head cap member 6 and the projecting piston rod 7. The tail cap member 8 is provided with a fixture portion 12, which may be attached to any rigid portion of an aircraft.

Disposed within a hollowed out portion 11 of the piston 3, and anchored to the piston, is a nut member 13. The nut 13 is provided with an internal spiral thread, which may be of semi-circular configuration. One end of a complementary spirally threaded screw shaft 15 engages the threaded nut through the media of a plurality of balls, not shown, to provide a substantially frictionless coupling therebetween similar to that disclosed and claimed in my copending application, Serial No. 78,412, filed February 25, 1949. One end of the screw shaft 15 extends within the hollow piston rod 7, and the other end of the shaft is formed integral with a locking collar 17. A tubular portion 21 between the end of the screw shaft 15 and the locking collar 17 engages the inner races of bearing means 14, which journal the screw shaft and locking collar as a unit for rotation within the cylinder 2. The inner races of the bearings 14 are maintained in engagement with a shoulder of the collar 17 by means of a ring 19 which threadedly engages one end of the portion 21. The outer races of the bearings 14 are retained in position by means of a channeled ring 16 which urges them against a radially inward extending shoulder formed on the tail cap member 8. The ring 16 is urged to the right, as viewed in Fig. 1, when the tubular member 4 is threaded into engagement with the tail cap member 8.

The piston 3 divides the cylinder 2 into a retract chamber 18 and an extend chamber 20. Retract chamber 18 communicates with a port 22 in the head cap member 6, while extend chamber 20 communicates through the bearing means 14 with a port 24 in the tail cap member 8. Suitable valve means, to be later described, are utilized to control the flow of fluid to and from the actuator cylinder chambers. Upon the application of fluid pressure to one of the actuator chambers and the coincident exposure to drain of the other actuator chamber, the piston 3 will undergo a reciprocal movement, which movement will be permitted and will effect rotative movement of the screw shaft 15, by reason of the ball-nut connection therebetween, if the locking means, to be described, has been released.

Referring particularly to Figs. 2, 3 and 4, the locking means will now be described. Coaxially disposed within the locking collar 17 is a cam member 26. The cam member 26 is restrained from rotation by reason of a pair of dowel pins 28, the ends of which respectively engage the cam member and the tail cap member 8. The cam member 26 is provided with three axially extending flats 30 which includes an angle of at least 60°. The flats 30 are separated by arcuate surfaces 32, which surfaces are concentric with respect to the locking collar 17. The cam member 26 is also provided with a cylindrical extension 34. Rotatably mounted on the cylindrical portion 34 is a lock releasing collar 23 having three axially extending fingers 25, which are disposed coaxially between the arcuate surfaces 32 of the member 26 and the locking ring 17. Mounted on each of the flats 30 is a double acting roller type clutch which constitutes a bidirectional locking mechanism. Each of the roller locking mechanisms include a pair of rollers 27 normally urged apart by a preloaded spring 29 so that each roller engages an edge surface of one of the fingers 25. Opposite ends of the spring 29 engage medial portions of the rollers 27.

The locking means are termed "bidirectional" inasmuch as they positively restrain rotation of the screw shaft in both directions when locked, and can only be released to permit rotation of the screw shaft in either of, but not both directions, at any one time. For instance, if the locking means are released to permit clockwise rotation of the screw shaft, the locking means will still be operative to prevent counterclockwise rotation of the screw shaft. The converse is also true, that is, when counterclockwise rotation is permitted, clockwise rotation is prevented. Thus, if the load imposed on the piston should momentarily exceed the force of the fluid pressure admitted to the cylinder, and by acting in opposition thereto, the piston will not move until sufficient pressure is attained to overcome the load. It is apparent that this feature is highly advantageous, and does not obtain in previous actuators employing dog-tooth or friction type locking devices which can only be fully released. The bidirectional locking means of this invention can only be partially released to permit rotation of the screw shaft, and hence movement of the piston, in either direction, but not in both directions at the same instance. Accordingly, the term "bidirectional" as used in the specification and appended claims, is to be interpreted as locking means which can only be released to permit movement of the piston in one direction at any one time.

With the several elements of the locking means in the position shown in Fig. 4, relative rotation between locking collar 17 and the cam member 26 is prevented in both directions in the following manner. If locking collar 17 tends to rotate counterclockwise or clockwise, three of the rollers 27 will be wedged between the flats 30 and the inner circumferential surface of the locking collar 17 whereby any relative rotation is restrained. To permit relative rotation between the locking collar 17 and the member 26, a predetermined arcuate movement of the fingers 25 must occur. Referring to Fig. 5, fingers 25 have been moved counterclockwise which effects a movement of three of the rollers toward their mating rollers, which are restrained from movement by reason of the flats 30 and the inner circumferential surface of the locking collar 17. When one roller of each pair moves toward the other, the springs 29 are compressed and the roller which is moved disengages the locking means enabling rotation of the locking collar 17 in only one direction. Thus, as it is shown in Fig. 5, with the fingered element moved counterclockwise from its position in Fig. 4, the locking collar 17 is free to rotate clockwise but is restrained from rotation counterclockwise. The opposite conditions will prevail upon movement of the fingers clockwise. That is, locking collar 17 is then permitted to rotate counterclockwise, but is restrained from clockwise rotation.

The specific means for effecting arcuate movement of the lock release collar 23 and the fingers 25 will now be described, as is shown diagrammatically in Fig. 2 and structurally in Fig. 3. The locking collar 23 is provided with a single notch 31 in its outer circumferential surface. A one-toothed rack 33 meshes with the notch 31, the rack 33 being operatively connected to a piston rod 35 having oppositely extending threaded portions, one of which, 37, is shown in Fig. 3. Attached to the end portions of rod 35 are piston heads 39 and 41, respectively, suitable screw devices maintaining the piston heads in position. As is shown diagrammatically in Fig. 2 and structurally in Fig. 1, piston head 41 having an O-ring seal 43 is housed within a lock release cylinder 36 which is formed as an integral part of the tail cap member 8. The lock release cylinders extend transversely of the actuator cylinder 2, only one being shown in Fig. 1. The piston 39 having an O-ring seal 45 is housed within a second lock release cylinder 38. Disposed between an end wall of the cylinder 38 and the piston 39 is a preloaded spring 40. Likewise, disposed between an end wall of the cylinder 36 and the piston 41 is a preloaded spring 42. The function of the preloaded springs 40 and 42 is to maintain the lock release collar 23 and the fingers 25 in the position they are shown in Figs. 2 and 4, during the absence of fluid pressure from either of the cylinders 36 or 38. The cylinders 36 and 38 are connected by passages 44 and 46, respectively, to ports of a slide valve mechanism 50, the position of which is controlled by lever 51. Passage 44 also communicates with actuator port 22 and one port of the valve mechanism 50, while passage 46 communicates with actuator port 24 and a second port of the valve mechanism.

*Operation*

When the valve mechanism is actuated to effect the application of hydraulic fluid medium under pressure to the retract chamber 18 of the actuator, fluid under pressure is simultaneously transmitted via passage 44 to the lock release cylinder 36. As a result, the piston 41 and the rod 35 will be moved to the left, as viewed in Fig. 2. Movement of the rod 35 and its associated rack 33 to the left will effect a counterclockwise movement of the lock release collar 23 and the fingers 25 to the position they are shown in Fig. 5. In this instance, the bidirectional locking means are partially released to allow rotation of the locking collar 17 clockwise. Accordingly, the fluid pressure directed to retract chamber 18 and the concurrent exposure to drain of the extend chamber 20 will effect reciprocal movement of the piston 3 to the right, as viewed in Fig. 1. By reason of the ball screw-nut connection between the piston 3 and the screw shaft 15, the screw shaft will rotate clockwise, as permitted by the partially released locking means. When the desired movement of the load device, operatively connected to the fixture 9 of the rod 7, has been effected, movement of the control valve mechanism to the neutral position will effect a repositioning of the several elements of the locking mechanism to the position they are shown in Figs. 2 and 4. When it is desired to extend the load device associated with the piston rod 7, the valve mechanism is moved in the opposite direction causing concurrent application of fluid pressure to the extend chamber 20 and to the lock release cylinder 38. In this instance, rotation of the lock release collar 17 will be permitted in a counterclockwise direction, but will be restrained in a clockwise direction, and the piston 3 may be moved to the left, as viewed in Fig. 1. By reason of the locking means preventing rotation of the locking collar 17 in the clockwise direction, should the combined forces of the load exceed that of the fluid pressure in the extend chamber 20, uncontrolled movements of the load device will be prevented.

From the aforegoing description, it is apparent that by providing bidirectional locking means, in contradistinction to the conventional unidirectional locking means, the present invention greatly enhances the prospective use and application of fluid pressure operated actuators. Moreover, the locking means are positive acting in nature, and will require very little attention after initial installation.

While the embodiment of the present invention as herein disclosed, constitutes a preferred form, it is to be understood that other forms might be adopted.

What is claimed is as follows:

1. A fluid pressure operated actuator comprising in combination, a cylinder, a reciprocable member disposed therein, an element rotatably journaled in said cylinder and operatively connected with said reciprocable member whereby reciprocal movement thereof effects rotative movement of said element, locking means operatively associated with said rotatable element for preventing movement thereof and consequent reciprocal movement of said member, said locking means being bidirectional in nature and including a locking collar attached to said rotatable element, a nonrotatable cam member coaxially disposed within said locking collar, and a plurality of roller-lock mechanisms associated with said cam member, and means operative upon application of fluid pressure to said cylinder for releasing the said locking means to permit rotative movement of said element and reciprocal movement of said member.

2. A fluid pressure operated actuator including in combination, a cylinder, a reciprocable piston disposed in said cylinder, an element rotatably journaled in said cylinder and operatively connected with said piston whereby reciprocal movement thereof effects rotative movement of said element, locking means interposed between said cylinder and said rotatable element for preventing movement thereof and consequent reciprocal movement of said piston, said locking means being bidirectional in nature, and means operative concurrently with the application of fluid pressure to either side of the piston for releasing the locking means to permit only unidirectional movement of said rotatable element and said piston.

3. A fluid pressure operated actuator including in combination, a cylinder, a reciprocable piston disposed in said cylinder, an element rotatably journaled in said cyliner and operatively connected with said piston whereby reciprocal movement thereof effects rotative movement of said element, locking means interposed between said cylinder and said rotative element for preventing rotative movement thereof and consequent reciprocal movement of said piston, said locking means being bidirectional in nature and including a locking collar integral with said rotatable element, a nonrotatable cam member coaxially disposed within said locking collar, said cam member having a plurality of flats separated by a like number of arcuate surfaces, and a plurality of roller-lock mechanisms mounted on said flats, and means operative concurrently with the application of fluid pressure to either side of said piston for releasing the said locking means to permit unidirectional movement of said rotatable element and said piston.

4. A fluid pressure operated actuator including in combination, a cylinder, a reciprocable member disposed therein, an element rotatably journaled in said cylinder and operatively connected with said reciprocable member whereby reciprocal movement thereof effects rotative movement of said element, means for connecting said member to a load device, means associated with said rotatable element for preventing movement thereof by said load device under all conditions comprising a bidirectional locking mechanism wholly disposed within said cylinder, and means operative upon application of fluid pressure to said cylinder for releasing said second recited means to permit movement of said load device only through movement of said reciprocable member and said rotatable element, said releasing means including a lock release collar journaled for rotation within said cylinder and having a plurality of axially extending fingers operatively associated with said bidirectional locking mechanism whereby arcuate movement of said lock release collar partially releases said bidirectional locking mechanism to permit unidirectional movement of said reciprocable member and said rotatable element.

5. A fluid pressure operated actuator including in combination, a cylinder, a reciprocable piston disposed in said cylinder, means operatively connecting said piston with a load device, an element rotatably journaled in said cylinder and operatively connected with said piston whereby reciprocal movement of said piston effects rotative movement of said element, bidirectional locking means interposed between said rotatable element and said cylinder for preventing movement of said element in the absence of fluid pressure applied to said piston whereby said load device cannot effect movement of said piston, and means operative concurrently with the application of fluid pressure to said cylinder for partially releasing said bidirectional locking means to permit only unidirectional movement of said element, piston and load device.

6. The combination set forth in claim 5 wherein the lock releasing means includes a pair of lock release cylinders disposed transversely of said actuator cylinder, a lock release piston disposed in each cylinder, a common piston rod connecting said pistons, and means operatively connecting said piston rod with said bidirectional locking means whereby movement of said rod in either direction will effect a partial release of said locking means to permit unidirectional rotation of said element in either of two directions.

7. In an actuator of the type having a cylinder and a piston disposed in said cylinder and mounted for reciprocal movement therein under the urge of fluid pressure, movement of said piston being dependent upon rotation of an element journaled in said cylinder and operatively connected with said piston, bidirectional locking means operatively associated with said rotatable element, said locking means comprising a locking collar attached to said rotatable element, a cam member coaxially disposed within said locking collar and rigidly connected to said cylinder and a plurality of roller-lock mechanisms associated with said cam member, means operative upon application of fluid pressure to either side of said piston for releasing said locking means to permit movement of said rotatable element and piston in one direction, said releasing means comprising a lock release collar journaled for rotation on said cam member and having a plurality of axially extending fingers operatively associated with said roller-lock mechanisms, said lock release collar having a notch therein, a rack engageable with said notch whereby reciprocal movement of said rack effects arcuate movement of said lock release collar, and means for effecting reciprocal movement of said rack to permit reciprocal movement of said piston.

8. A fluid pressure operated actuator including in combination, a cylinder, a reciprocable piston disposed in said cylinder capable of fluid pressure actuation in either direction, an element rotatably journaled in said cylinder and operatively connected with said piston such that movement of said piston effects rotation of said element, and releasable locking means wholly disposed in said cylinder and operatively associated with said element for preventing rotation thereof and consequently preventing reciprocation of said piston, said locking means being bidirectional in nature so that when released, movement of said element and said piston in either of, but not both directions, is permitted at any one time.

9. A fluid pressure operated actuator including in combination, a cylinder, a reciprocable piston disposed in said cylinder capable of fluid pressure actuation in either direction, an element rotatably journaled in said cylinder and operatively connected with said piston such that movement of said piston effects rotation of said element, the operative connection between said element and piston including a non-rotatable member having threaded engagement with said element and constrained for movement with said piston, and releasable locking means wholly disposed in said cylinder and operatively associated with said element for preventing rotation thereof and consequently preventing reciprocal movement of said piston in the absence of fluid pressure application to said cylinder, said locking means being bidirectional in nature so that when released, movement of said element and said piston in either of, but not both directions, is permitted at any one time.

10. An actuator assembly including in combination, a cylinder, a reciprocative piston in said cylinder, an element rotatably journaled in said cylinder, said element being operatively connected to said piston, the operative connection between said piston and said element including a hollow member restrained against rotation and constrained for movement with said piston, said element extending through said hollow member and operatively engaging the same whereby relative rotation will occur between said member and element upon reciprocative movement of said piston, and releasable locking means including a cam member rigidly connected to said cylinder operatively associated with said element for restraining rotation thereof and, consequently, preventing reciprocative movement of said piston when the actuator is inactive, said locking means being bidirectional in nature so that when released, piston movement in either of, but not both directions, is permitted at any one time.

References Cited in the file of this patent

UNITED STATES PATENTS

| | | |
|---|---|---|
| 843,637 | Smith | Feb. 12, 1907 |
| 1,183,213 | Lewis | May 16, 1916 |
| 1,643,563 | Nell | Sept. 27, 1927 |
| 1,766,510 | Gregory | June 24, 1930 |
| 2,205,346 | Clench | June 18, 1940 |
| 2,274,334 | Keller | Feb. 24, 1942 |
| 2,369,797 | Rappl | Feb. 20, 1945 |
| 2,477,108 | Young | July 26, 1949 |
| 2,615,429 | Jacques | Oct. 28, 1952 |

FOREIGN PATENTS

| | | |
|---|---|---|
| 436,271 | France | Jan. 9, 1912 |
| 443,871 | Great Britain | Mar. 5, 1936 |
| 61,867 | Netherlands | Oct. 15, 1948 |